United States Patent [19]
Pipes et al.

[11] 3,892,186
[45] July 1, 1975

[54] FREE AND POWER CONVEYOR SYSTEM

[75] Inventors: George R. Pipes, South Euclid; James D. Peppers, Wickliffe; Wayne T. Mormile, Mayfield Heights, all of Ohio

[73] Assignee: Eaton Corporation, Cleveland, Ohio

[22] Filed: Aug. 8, 1973

[21] Appl. No.: 386,667

Related U.S. Application Data

[62] Division of Ser. No. 241,116, April 5, 1972, Pat. No. 3,795,200.

[52] U.S. Cl. .................................................. 104/249
[51] Int. Cl. ............................................. B61b 13/12
[58] Field of Search .......... 104/172 S, 96, 249, 250, 104/251, 252, 253, 178

[56] References Cited
UNITED STATES PATENTS 3,523,504 8/1970 Jones ............................. 104/172 S
3,744,432 7/1973 Price et al. .................... 104/172 S

*Primary Examiner*—Evon C. Blunk
*Assistant Examiner*—Robert Saifer
*Attorney, Agent, or Firm*—Teagno & Toddy

[57] ABSTRACT

A conveyor system having pusher assemblies on a driven chain supported above a carrier track along which carriers are propelled with each carrier having a front trolley having a push lug and a rear trolley having a release camming lug. The pusher assemblies include a pivotedly supported front pusher dog assembly and a pivotally supported rear pusher dog assembly with the front pusher dog assembly including a forwardly projecting release blade for releasing the pusher dog from driving engagement with the push lug on the carrier. Provision is also made for accumulation of carriers, batch re-entry of carriers, carrier switchout and control of the carriers when traversing inclines.

6 Claims, 11 Drawing Figures

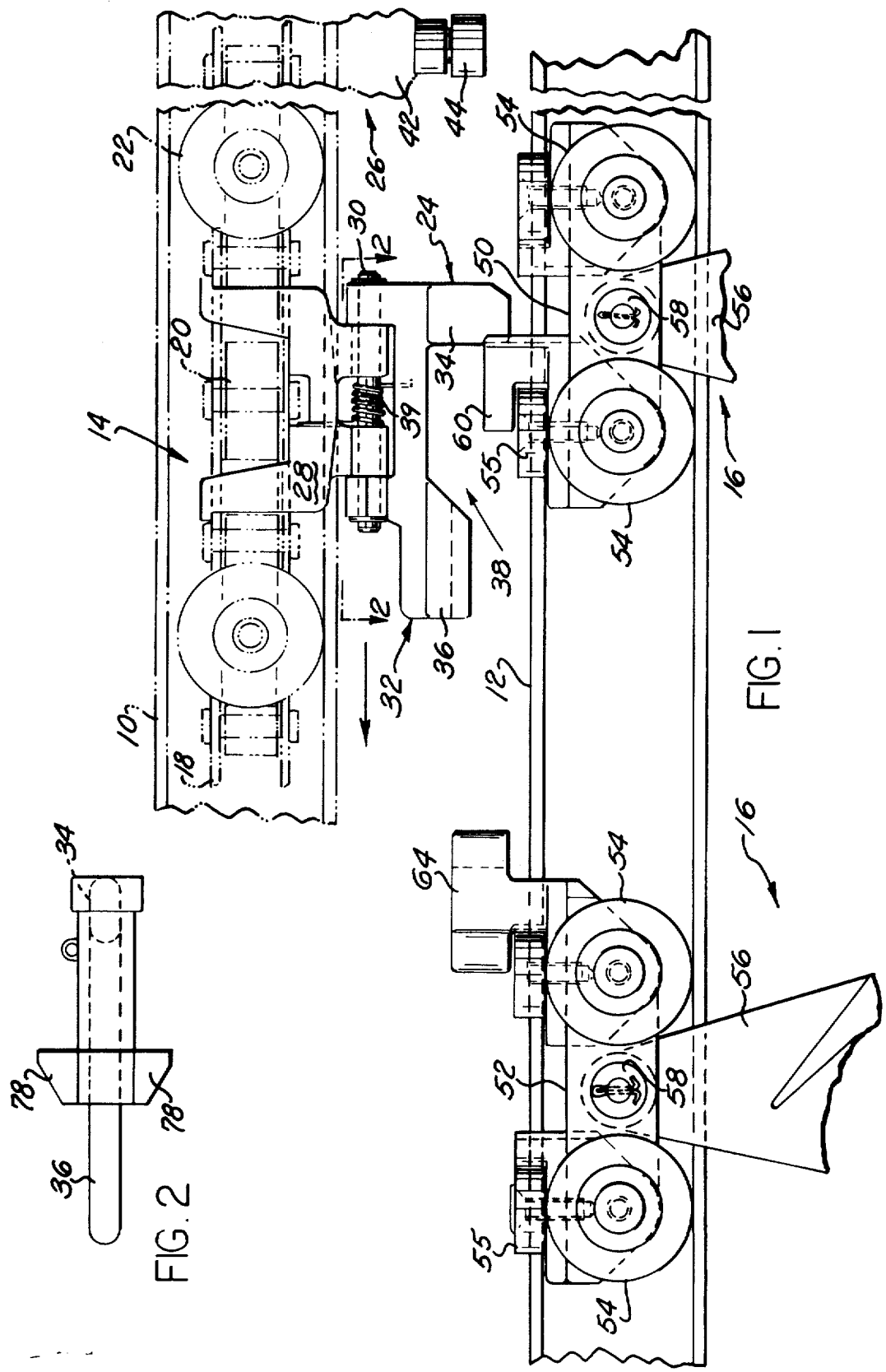

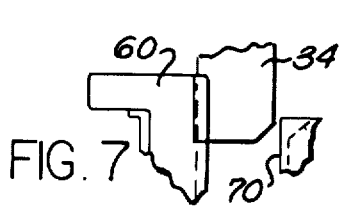
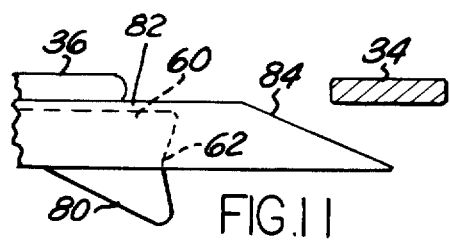
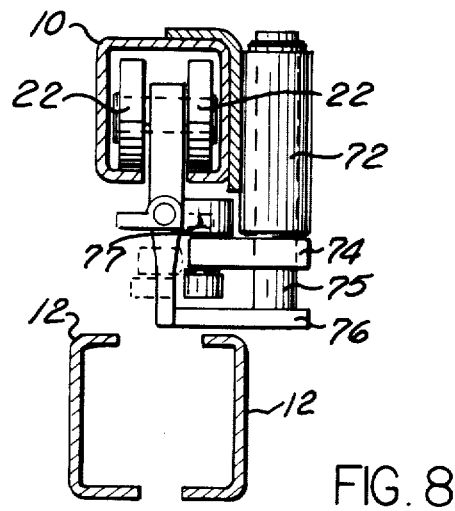
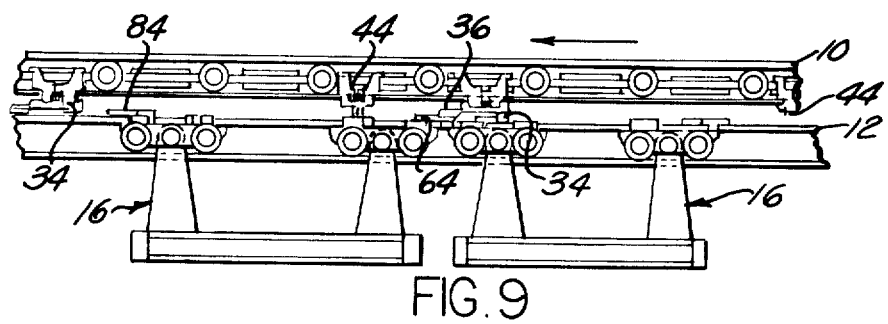
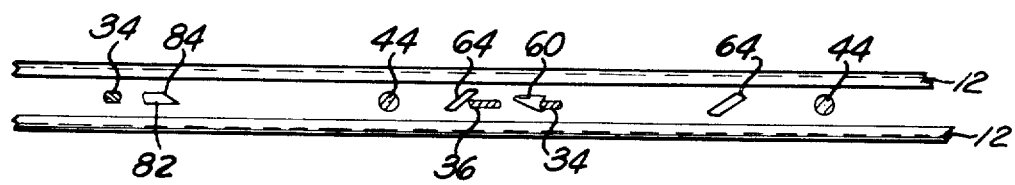

FREE AND POWER CONVEYOR SYSTEM

This is a division of application of Ser. No. 241,116 filed Apr. 5, 1972 now U.S. Pat. No. 3,795,200.

This invention relates to conveyor systems and, more particularly, to an overhead free and power conveyor system of the type having pusher assemblies on an endless chain for propelling carriers along a carrier track.

It is an object of this invention to provide a free and power conveyor system comprising a front pusher assembly and a carrier movable along a track adjacent the pusher assembly with the pusher assembly including a pusher dog supported for pivotal movement about an axis parallel to the path of travel of said pusher assembly and the carrier including front and rear trolley members with a push lug on the front trolley engageable by a pusher dog on the pusher assembly for propelling the carrier along the track and a camming lug on the rear trolley with the camming lug including cam surface means engageable by the pusher dog for pivoting the pusher assembly about said axis to permit the pusher assembly to pass the rear trolley.

It is a further object of this invention to provide a free and power conveyor system of the above described type and in which the carrier is freely movable along the track independent of the pusher assembly and wherein the camming lug on the rear trolley is provided with a forwardly facing camming surface and a rearwardly facing camming surface with the two camming surfaces being operative to pivot the pusher dog to enable the rear trolley to overtake and pass a pusher assembly.

A further object of the invention is to provide a free and power conveyor system in which carriers may be freely introduced to the power system without jamming against the pusher assemblies. To this end, the push lug on the front trolley of each carrier is provided with a forwardly extending camming surface which is operative to cammingly engage the push dog of the pusher assembly and pivot the pusher assembly aside to permit unimpeded entry of the carrier into the system.

A still further object of the invention is to provide a free and power conveyor system in which carriers may be accumulated by causing the pusher assemblies to override the carriers. More particularly, each of the pusher assemblies is provided with a forwardly extending release blade or nose which is operative to to engage the camming surface on the camming lug of the rear trolley of a carrier that has been stopped in the system. The cooperation between the release blade and the camming surface causes the pusher dog assembly to pivot to release the carrier being towed and the camming engagement of the pusher dog with the camming lug enables the pusher assembly to override the rear trolley of the stopped carrier.

It is another object of this invention to provide a free and power conveyor system which is provided with a rear pusher dog assembly operative to provide a rear trolley push capability to complete a carrier traverse through a switch.

Still a further object of the invention is to provide a free and power conveyor system which includes carrier qualifier apparatus operative to assure front trolley towing of a carrier as the carrier moves up an incline.

These objects and features of the invention, as well as others, are more fully described in the following description which, together with the attached drawings, discloses but a preferred form of the invention.

Referring now to the drawings wherein like reference numerals indicate like parts in the various views:

FIG. 1 is a partial side elevation view of a free and power conveyor system constructed in accordance with this invention.

FIG. 2 is a top plan view of the pusher assembly taken generally along line 2—2 of FIG. 1.

FIG. 7 is a fragmentary view illustrating the relationship between the pusher dog and the front trolley as the carrier descends along an inclined surface.

FIG. 8 is a schematic illustration of a mechanism for assuring front trolley towing as a carrier moves up an incline.

FIG. 9 is a schematic side elevation of the conveyor system showing the carriers as they are being accumulated.

FIG. 10 is a top plan view of the system of FIG. 9.

FIG. 11 illustrates the release of the front pusher assembly as it passes a stop in the system.

Figure 3:
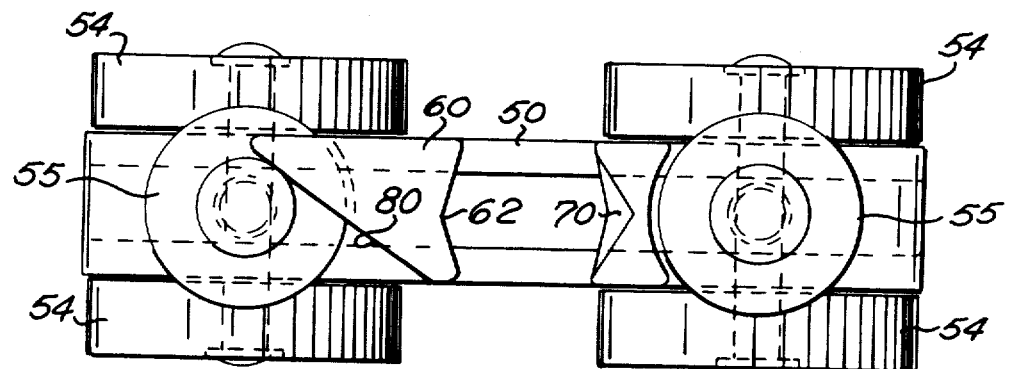
FIG. 3 is a top plan view of the front trolley of the carrier.

Referring now more in detail to the drawings and particularly FIG. 1, there is illustrated a conveyor system which includes a pair of vertically spaced apart tracks 10, 12. A pusher mechanism indicated generally by the reference numeral 14, is associated with track 10 and a carrier assembly 16 is associated with track 12.

PUSHER MECHANISM

The pusher mechanism 14 includes an endless chain 18 which is supported in the track 10 by horizontal side guide wheels 20 and vertical guide wheels 22. A plurality of front pusher dog assemblies 24 and rear pusher dog assemblies 26 are spaced along and carried by the endless chain 18. The front pusher dog assembly 24 comprises a pendant body portion 28 which supports a pivot pin 30. Pivotally supported on the pivot pin 30 is a dog body 32 with a depending pusher dog 34 and a forwardly projecting cam follower nose or blade 36. The pusher dog 34 and cam follower blade 36 are of a unitary construction and are spaced from each other to define therebetween an opening 38. A coil spring 39 acts between the pendant body 28 and the dog body 32 to normally bias the dog body to the position shown in FIG. 1. However, the dog body 32 may pivot in either direction about pin 30.

Figure 5:
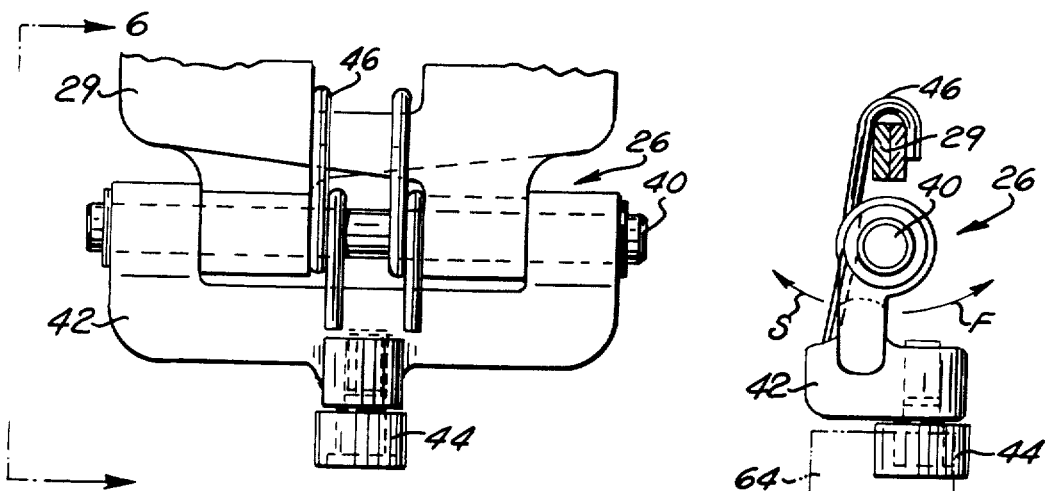
FIG. 5 is a partial side elevation view of the rear trolley pusher assembly.
Figure 6:
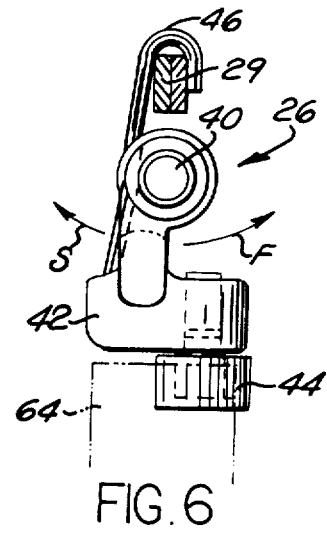
FIG. 6 is an end elevation view of the rear pusher assembly.

The rear pusher dog assembly 26 (FIGS. 5 and 6) also comprises a pendant body 29 connected to the chain 18 and which supports a pivot pin 40 to which a dog body 42 is pivotally connected. The dog body 42 further includes a depending rear pusher dog 44 which comprises a roller supported for rotation about a vertical axis. The spring 46 acts between the pendant body 28 and the dog body 42 to pivot the rear pusher dog to the position shown in FIG. 6, with the pusher dog being pivotable against the spring in the direction S and in a free swing direction F. The pusher dog 44 extends downward a distance less than the pusher dog 34 on the front assembly 24.

CARRIER

Each of the carrier assemblies 16 comprises a front trolley 50 and a rear trolley 52. As shown in FIG. 1, only the front trolley of a carrier is illustrated in association with the front pusher dog assembly 24 and the rear trolley of a second carrier is illustrated in the left hand portion of that FIGURE. Each of the front and rear trolleys comprises a plurality of trolley wheels 54 which are supported in the trolley track 12. Vertical load support members 56 are pivotally supported by pins 58 on each of the trolleys and a variable length load bar, not shown, extends between the load support members 56 for supporting a load in a manner well known in the art. Each of the trolleys also includes pairs of horizontally mounted guide wheels 55 which engage the top slot in the track 12 to provide lateral stability for the trolleys 50, 52.

The front trolley assembly 50 also includes an upwardly projecting push lug 60 which is adapted to cooperate with the pusher dog 34 as illustrated in FIG. 1. The push lug 60 has a generally V-shaped abutment surface 62 against which the pusher dog 34 engages. It will be appreciated that with the pusher dog 34 engaged against the abutment surface 62 of the push lug 60, the trolley 50 will be moved along the track 12 as the pusher dog assembly 24 is carried by the chain 18.

The rear trolley 52 is provided with an upwardly projecting lug 64 which is positioned at the rear of the trolley 52. This upwardly projecting lug 64 defines a rearwardly facing angularly disposed surface 66 which serves as a camming surface for a purpose hereinafter described. As is apparent from FIG. 1, the lug 64 extends upwardly above the track 12 a greater distance than the push lug 60 on the front trolley 50.

The foregoing describes the basic carrier and pusher assemblies. Other aspects and features of the system will be described in the following description of the system operation.

Figure 4:
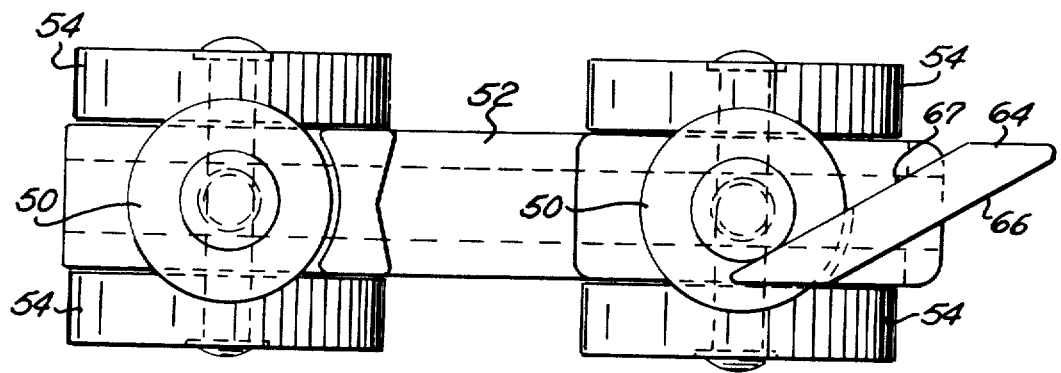
FIG. 4 is a top plan view of the rear trolley of the carrier.

In normal operation along a flat section of track such as shown in FIG. 1, the pusher dog 34 is in engagement with the push lug 60 on the front trolley 50 and tows the carrier therealong. The normal spacing between the tracks 10, 12 of the system is such that the blade 36 on the pusher dog assembly 24 is spaced vertically above the push lug 60. Accordingly, the carrier 16 can at any time be moved ahead of the pusher dog assembly 24 simply by manually pushing the carrier 16 in the forward direction of travel with the push lug 60 passing beneath the blade 36. In addition, as the lug 64 on the rear trolley 52 approaches the pusher dog 34, a cam surface 67 on the lug 64 (FIG. 4) engages the pusher dog to cause the pusher dog assembly 24 to pivot against the bias of the spring 39 thereby allowing the rear trolley to pass. A similar camming action between the cam surface 67 and the blade 36 occurs to permit the rear trolley to pass beyond the pusher dog assembly 24.

If the carrier is moved forward sufficient to overtake a dog assembly 26, the lug 60 will simply pass beneath dog 44 while cam surface 67 will act against dog 44 to pivot the assembly 26 in the direction F so that the carrier may pass unimpeded.

If, for any reason, the carrier is then left at rest on the track 12, the pusher dog assembly 24 will catch up to the carrier. As the pusher dog assembly 24 approaches the rear trolley 52, the forwardly projecting blade 36 will bengage the cam surface 66 causing the dog assembly to again pivot to allow the blade 36 to pass beyond the lug 64. In a similar manner, the pusher dog 34 will engage the cam surface 66 to cam the pusher dog assembly aside and permit the pusher dog 34 to pass beyond the lug 64. As the pusher dog assembly 24 approaches the front trolley 50, the blade 36 will pass over the push lug 60 but the pusher dog 34 will engage the surface 62 on the push lug 60 to again pick up the carrier and propel it along the track 12.

CHANGES IN ELEVATION

The pusher dog 34 is adapted to cooperate with the front trolley as the carrier declines to a lower level to hold back the carrier. To provide the hold-back, it is contemplated that the carrier track 12 will be provided with a transistion section immediately prior to the decline with the transition section being spaced from the pusher track 10 a distance less than the normal track spacing. This closed up spacing of the two tracks is maintained through the decline section of track. As the carrier moves on to the closed up transition section, the effect is to move the pusher dog 34 further into the front trolley 50 to the position shown in FIG. 7 where the pusher dog now lies in the path of the rear portion 70 of the trolley 50. As the carrier then begins to descend along the declining section of the track, any tendency of the carrier to move ahead of the pusher dog assembly is restrained by the interference between the rear surface of the pusher dog 34 and the surface 70 thereby holding back the carrier as it declines. Once having reached the lower level, the spacing between the tracks 10, 12 is returned to normal so that the pusher dog and the carrier return to the relationship shown in FIG. 1.

In moving up inclined surfaces, it is desirable to make certain that each carrier is being towed by the front trolley. If, for some reason, a carrier is being pushed by the rear pusher assembly as the carrier moves up the incline the resistance of the carrier may cause cam surface 66 to cam dog 44 aside thereby releasing the carrier and permitting the carrier to fall back.

To avoid this, the qualifier mechanism 72 illustrated in FIG. 8 may be associated with the track in advance of each incline. This mechanism comprises a spring-biased arm 74 pivotally supported on an axis 75 adjacent track 10. The arm includes a stop 76 and a cam follower 77. The arm is normally positioned by the spring bias such that stop 76 extends into the path of travel of lug 60 and cam follower 77 is positioned in the path of travel of qualifier camming tabs 78 on pusher assemebly 24.

If a carrier is being front trolley towed as it approaches the qualifier mechanism, the camming tabs 78 will engage cam follower 77 to pivot arm 74 and thereby move stop 76 out of the path of lug 60 to enable the front trolley to pass. The cam surface 67 on the rear trolley will cam the stop 76 aside to permit the rear trolley to pass.

In the event the carrier is being rear trolley pushed, the front pusher assembly 24 will pass through the qualifier mechanism before the front trolley has reach stop 76. As the front trolley reaches the qualifier, lug 60 engages stop 76, halting the carrier and causing cam surface 66 to cam the rear pusher assembly 26 to release the carrier. The carrier remains halted on the track until the next pusher assembly 24 comes by and tows the carrier through the qualifier mechanism and up the incline.

CARRIER SWITCHOUT

To switch a carrier from the power section to a free section, a diverter tongue (not shown) which may be of a conventional construction and solenoid controlled is selectively actuated at the switching section to divert a carrier on to the free track. As the front trolley of the carrier enters the curved portion of the switch, the pusher dog 34 separates from the surface 62 on the push lug 60. Normally, the momentum of the carrier is insufficient to move the carrier fully through the switch on to the free track once the pusher dog 34 has released the trolley. However, as the carrier loses momentum, the rear pusher dog assembly 26 catches up with the rear trolley 52 and the rear pusher dog 44 coacts with the surface 66 on the rear carrier lug 64. Although the cam surface 66 tends to pivot dog 44 in the direction S, the spring 46 provides sufficient resistance to this pivoting action to enable dog 44 to move the carrier through the switch. Preferably, the free track is provided with an inclined section adjacent to the switching section and down which the carrier will roll to an appropriate stop which will retain the carrier until it is desired to reinsert it into the power line.

CARRIER RE-ENTRY

In a free and power system, it is desirable to be able to introduce any number of carriers into a power line from a free line at a speed greater than that at which the power chain is running. In addition, it is also desirable that the carriers be capable of being inserted into a power line without regard to the position of the pusher dog assemblies on the power chain. To this end, the push lug 60 on the front trolley is provided with a front cam surface 80. This cam surface is adapted to co-act with the pusher dog 34 to cam the pusher dog assembly 24 aside in the event a pusher dog is passing by the re-entry switch area just as the carrier is being moved back on to the power track.

If the carrier is introduced into the power line at a speed faster than that of power chain 18 thereby causing the front trolley 50 to overtake a pusher assembly 24, cam surface 80 will pivot the pusher assembly aside and thereby permit the carrier to pass.

ACCUMULATION

It is a desirable feature of a power and free conveyor system to be able to accumulate carriers against a controlled stop at any desired location along the tracks with the pusher dog assemblies overriding each of the stopped carriers. One specific example of the use of this feature is where it is desired, for traffic control reasons, to feed new carriers into the power line from a free line while holding up and accumulating carriers ahead of the switch until activity through the switch is completed. Thereafter, the pusher assemblies should be operative to pick up the carriers, lead carrier first, and resume normal operations along the track.

FIGS. 9–11 illustrate the manner in which the system may be used to accumulate carriers. As shown in FIG. 10 a suitable stop 82 is selectively positionable in the carrier path along track 12. With the stop in the position shown, stop 82 blocks passage of the carriers along the track thereby causing the carriers to accumulate behind the stop.

To release the pusher assembly towing the first carrier to be accumulated, stop 82 is provided with a disengaging cam bar 84 which includes a cam surface engageable with blade 36. As the front trolley approaches the stop, blade 36 engages cam bar 84 thereby pivoting pusher assembly 24 aside and releasing pusher dog 34 from engagement with lug 60. Bar 84 maintains assembly 24 in a pivoted position until the assembly has cleared the stop.

The rear pusher dog assembly 26 will, of course, move into engagement with lug 64 on the rear trolley of the stopped carrier; however, cam surface 66 will cam dog 44 aside to allow it to pass the rear trolley.

As the next pusher dog assembly 24 moves a second carrier up behind the stopped carrier, the nose or blade 36 will engage the cam surface 66 on the lug 64 thereby causing the pusher dog 34 to be pivoted away from lug 60 to release the carrier. This co-action between the cam surface 66 and the blade 36 will maintain the pusher dog 34 out of engagement with the push lug 60 until the push dog has passed beyond the push lug 60. After the blade 36 has cleared the surface 66, the push dog body 32 will snap back to its original position but the pusher dog 34 will then engage the cam surface 66 and again cam the pusher dog assembly 24 to permit the dog 34 to clear the projection 64.

As this latter pusher dog assembly 24 moves along the stopped carrier, it will approach and engage cam bar 84 which will pivot assembly 24 to prevent it from engaging lug 60.

In this same manner, each subsequent pusher dog assembly 24 will be pivoted out of engagement with its associated trolley through the camming engagement of blade 36 against surface 66 on the rear trolley of the carrier immediately in front of it and this same camming action enables pusher dog 34 to override each carrier accumulated behind stop 80.

Each of the rear pusher dogs merely passes over the lugs 60 but does engage each lug 64 and is cammed aside as previously described.

Upon actuating stop 82 to remove it from its blocking position in track 12, each carrier in line will be picked up by the pusher assembly 14, starting with the first carrier to be stopped. Thus, each pusher dog assembly 24 will continue to override each of the accumulated carriers until it reaches the front carrier. Since the cam bar 84 has been removed and since there is no carrier in front of it, the blade 36 has no cam surface against which it can co-act and the dog 34 will move into driving engagement with the lug 60 on that carrier to propel it along the track.

While the invention has been described with reference to a specific illustrated embodiment and certain aspects of its operation, neither the illustrated embodiment nor the terminology employed in describing it is intended to be limiting; rather, it is intended to be limited only by the scope of the appended claims.

Having thus described the invention, what is claimed is:

1. A conveyor system of the type having an endless power chain supporting a plurality of spaced apart front and rear pusher assemblies and carriers supported by front and rear trolleys for movement along a track adjacent the power chain, said rear pusher assemblies being supported from said power chain independently of said front pusher assemblies and spaced apart therefrom with said carriers normally being towed by engagement of a front pusher assembly with the front trolley, the improvement comprising, qualifier means positionable in the path of travel of said carriers for halting movement of any carrier being propelled by the rear pusher assembly, said qualifier means comprising positive stop means located at one or more predetermined sections of said track where a rear pusher assembly is engageable with a trolley.

2. The improvement of claim 1 wherein said qualifier means includes means for releasing a halted carrier when a front pusher assembly engages the front trolley of the carrier.

3. Apparatus as claimed in claim 2, in which said means for releasing a halted carrier includes cam means formed on said front pusher assembly and on said qualifier means, said qualifier means being movable out of the path of travel of said carrier by engagement of said cam means.

4. Apparatus as claimed in claim 3, in which said cam means comprises a cam lug formed on said front pusher assembly, and a cam follower formed on said qualifier means.

5. Apparatus as claimed in claim 3, including means biasing said qualifier means into the path of travel of said carriers, engagement of said cam means overriding said biasing means.

6. In a conveyor system comprising an endless power chain, a plurality of front pusher assemblies supported by said power chain and spaced apart along said chain, a plurality of rear pusher assemblies supported by said power chain and spaced apart along said chain and front said front pusher assemblies, and a plurality of carriers supported by said front and rear trolleys for movement along a track adjacent said power chain, said carriers normally being towed by engagement of a front pusher assembly with a front trolley and said rear pusher assembly being normally in position to be engageable with a rear trolley, the improvement comprising:

qualifier means for halting movement of a carrier being propelled by engagement of a rear pusher assembly with a rear trolley, said qualifier means comprising positive stop means in the path of travel of said front trolley located at one or more positions along said track where a rear pusher assembly is engageable with a rear trolley.

\* \* \* \* \*